(12) United States Patent
Solgi

(10) Patent No.: US 12,130,886 B1
(45) Date of Patent: Oct. 29, 2024

(54) TENSOR AUTOMATIC DIFFERENTIATION

(71) Applicant: Mohammad Solgi, Goleta, CA (US)

(72) Inventor: Mohammad Solgi, Goleta, CA (US)

( * ) Notice: Subject to any disclaimer, the term of this patent is extended or adjusted under 35 U.S.C. 154(b) by 0 days.

(21) Appl. No.: 18/421,487

(22) Filed: Jan. 24, 2024

(51) Int. Cl.
*G06F 17/16* (2006.01)
(52) U.S. Cl.
CPC .................... *G06F 17/16* (2013.01)
(58) Field of Classification Search
CPC ........................................ G06F 17/16
See application file for complete search history.

(56) References Cited

U.S. PATENT DOCUMENTS

2014/0181171 A1* 6/2014 Dourbal ............... G06F 17/16
708/607

* cited by examiner

*Primary Examiner* — Michael D. Yaary

(57) ABSTRACT

Methods and systems are disclosed to reduce the time and memory complexities associated with automatic differentiation of tensor models. The disclosed embodiment consists of a tensor contraction gradient calculator (TCGC) method, a tensor automatic differentiation (TAD) method and a TAD system. The disclosed embodiment eliminates the need to compute partial derivatives or Jacobians for computing tensor gradients of tensor contractions and tensor models. The disclosed embodiment computes tensor gradients of any arbitrary tensor model automatically with both memory and time complexities asymptotically equal to those of the evaluation of tensor models that are theoretically the lowest achievable complexities.

20 Claims, 6 Drawing Sheets

TENSOR AUTOMATIC DIFFERENTIATION

TECHNICAL FIELD

The present disclosure generally relates to the field of tensor computation particularly to a system that reduces computational complexities associated with automatic differentiation of tensor models.

BACKGROUND

Tensors are arrays of numbers from a given field, and an n-way (order) tensor refers to an n-dimensional array of numbers, where each axis of the array corresponds to a different dimension. Tensor models are algebraic expressions of tensors which are used for various purposes like quantum computing, data science, machine learning, simulation of physical and chemical systems among others. Examples of tensor models are tensor networks and tensor decompositions. Usually, a tensor model may include elementwise functions, additions/subtractions, tensor multiplication, and tensor contractions. Tensor contraction is a key operation in tensor models and is dominantly used in different applications of tensor computation including tensor networks, tensor decomposition, tensor completion, and other instances of tensor models.

Gradient based methods like gradient descent can be applied to optimize parameters (tensors) of tensor models. Consequently, computing gradients of a tensor model with respect to its tensors becomes necessary. However, the complex nature of tensor models that may involve tensor contractions such as tensor networks render evaluating tensor gradients of such models challenging and even in some cases their computation becomes formidable given the potential for excessive time and memory complexities. Therefore, techniques are required for efficiently computing tensor gradients for tensor contractions and tensor models while optimizing the associated time and memory complexities.

SUMMARY

Novel methods and systems are disclosed to reduce the time and memory complexities associated with automatic differentiation of tensor models such as tensor networks and tensor decompositions. The disclosed embodiment eliminates the need to compute partial derivatives or Jacobians for computing tensor gradients of tensor contractions and tensor models. The disclosed embodiment computes tensor gradients of any arbitrary tensor model automatically with both memory and time complexities asymptotically equal to those of the evaluation of tensor models that are theoretically the lowest achievable complexities. The disclosed embodiment is comprised of a tensor contraction gradient calculator (TCGC) method, a tensor automatic differentiation (TAD) method and a TAD system.

The disclosed TCGC is a method to compute tensor gradients of a function defined on a tensor product, which is the output of a tensor contraction, with respect to the contracting tensors given the tensor product's gradient. Tensor contraction defined on some contracting tensors refers to a tensor operation that performs tensor inner product, also known as tensor dot product, over no, one, or several contracting dimensions of the contracting tensors, while implicitly resulting an outer product along the rest of the dimensions, and consequently, if there are no contracting dimensions, it results in a tensor outer product of the contracting tensors. The TCGC comprises (1) computing some transformations (2) transforming the contracting tensors using the computed transformations (3) computing auxiliary tensor gradients by a tensor contraction between the transformed tensors and the tensor product's gradient and (5) computing tensor gradients of the original contracting tensors by applying inverse functions on the computed auxiliary tensor gradients reversing the applied transformations. The transformation is defined such that when applied on the contracting tensors, the transformed tensors do not alter an equivalent tensor contraction's product. The equivalent tensor contraction is used to determine an appropriate tensor contraction between the transformed tensors and the tensor product's gradient to compute the auxiliary tensor gradients. In other words, the disclosed TCGC computes the tensor gradient of a tensor which is contracted with another tensor, as a function of a tensor contraction between a transformation of the other contracting tensor and the tensor gradient of the tensor product. For a tensor model which includes tensor contractions, the disclosed method eliminates the expensive computational cost of computing and storing Jacobians or partial derivatives explicitly to update the tensor gradients through differentiation tape or graph. This leads to a significant reduction of the associated memory and time complexities for tensor models. Meantime, the disclosed TCGC computes the tensor gradients of contracting tensors for any given arbitrary tensor contraction. The disclosed TCGC results in time and memory complexities asymptotically equal to the evaluation mode for tensor contractions. Furthermore, with capability of computing tensor gradients though a tensor contraction between the tensor gradient of the product and a transformation of the contracting tensors, the tensor contraction operation can be considered as a pseudo elementary tensor operation facilitating development of a computational model for tensor automatic differentiation. Consequently, the disclosed TCGC becomes an advantageous tool for computing the gradients of tensors for any given tensor model automatically and efficiently.

The TAD of the disclosed embodiment provides a platform for efficient automatic differentiation of tensor models. Unlike the prior art in automatic differentiation which is fundamentally defined on scalar variables and elementary scalar operations, with differentiation of arrays explicitly depending on computing partial derivatives, the TAD of the disclosed embodiment is defined on tensors, tensor operations and tensor gradients. The TAD method of the disclosed embodiment comprises (1) decomposing a tensor model into its tensors and tensor operations including elementary tensor operations and tensor contractions, (2) constructing a computational model consists of interconnected elements representing tensors and tensor operations where the computational model and its connections are arranged according to the tensor model, (3) assigning an initial tensor gradient to elements of the computational model (4) initializing the computational model's elements which represent tensors, (5) propagating computational model's data flow begins with the elements representing tensors and progresses toward the computational model's outputs simulating the tensor model in a forward path, (6) computing and propagating the computational elements' tensor gradients backward continues until all possible trajectories between each computational element of interest and computational model's outputs are traversed while accumulating tensor gradients for all trajectories between the element of interest and the model's outputs. In the disclosed TAD a tensor operation is defined as an elementary tensor operation where for a function defined on the tensor operation, the tensor gradients of the function with respect to the tensor operation's operands are each obtained by one elementary tensor operation defined, at minimum, on the tensor gradient of the function with respect to the tensor operation. In other words, in the disclosed TAD method, the tensor gradients of tensor operations are computed efficiently either by an elementary tensor operation for each elementary tensor operations or by the disclosed TCGC for tensor contractions. Finally, a TAD system for performing tensor automatic differentiation of a tensor model is disclosed. The TAD system comprises (1) at least one processor block, (2) at least one memory block, (3) input and output units, and (4) a computer readable storage medium storing computer executable instructions of the disclosed TAD method. The TAD method and system of the disclosed embodiment compute the tensor gradients of any arbitrary tensor model automatically with the minimum asymptotical computational complexities theoretically possible.

Unlike traditional automatic differentiation, the disclosed embodiment does not compute Jacobian or partial derivatives explicitly while computing tensor gradients for any arbitrary tensor model automatically. The state-of-the-art implementation of automatic differentiation herein referred to as "Jacobian automatic differentiation" reviewed by a non-patent publication, Morgossian, C. C. *"a review of automatic differentiation and its efficient implementation."*, *WIRE's Data Mining and Knowledge Discovery*, 9(4), 2019, relies on Jacobians and explicitly computing and storing intermediate partial derivatives to compute tensor gradients. Therefore, the time and memory complexities of computing the gradient of tensors using the automatic differentiation based on Jacobians may escalate to a point that the computation of tensor gradients becomes impractical. For example, let F be a composite function of tensor contractions such that $F=F^l \circ F^{l-1} \circ \ldots \circ F^i$ where $F^i=Q_i \times_{1,\ldots,s_i} F^{i-1}$, $F^1=Q_1$, and $Q_i$ is a tensor variable $\forall i=1, \ldots, l$ for some l. In other words, F represents an instance of a tensor network. For such a composite function, automatic differentiation based on Jacobians may pose impractical due to memory and time complexities. Furthermore, computing and storing intermediate Jacobians for estimating the tensor gradients is inefficient even when the computational complexities are feasible. In short, Jacobian automatic differentiation theoretically can compute the derivative of a tensor model, but in practice, it is inefficient, and the inefficiency causes the task becomes formidable for some tensor models. For example, computing the tensor gradients with the state-of-the-art implementation of Jacobian automatic differentiation by a non-patent publication Abadi et al. *"TensorFlow: a system for large-scale machine learning" Proceedings of the 12th USENIX conference on Operating Systems Design and Implementation*, 2016, p265-283, contracting only three 4-way tensors each with dimension sizes equal to k, over two dimensions became impossible for k>11 due to lack of memory on a Graphics Processing Unit (GPU) with 8 GB (8 Gigabyte) memory in a 32-bit floating-point representation. While the contracting tensors collectively use only a small portion of the memory, the memory requirements for partial derivatives for such tensor model grow exponentially. For scalar expressions, the computational complexities of Jacobian automatic differentiation are asymptotically equal to their evaluation, making it an efficient method. However, the Jacobian automatic differentiation is not efficient for tensor models. For the experiment mentioned above, when k is set to 12, the total size of the tensor is approximately 0.25 MB ($3\times12^4\times4$ byte), which is negligible compared to 8 GB memory of the GPU used. So, it would be expected the differentiation of much larger tensors could be possible on a GPU with 8 GB memory. However, partial derivatives grow exponentially. To clarify, consider the above example of three 4-way tensor contractions: when the first two tensors are contracted over two dimensions, the output tensor would be a $12^4$ which is again contracted over two dimensions with another tensor of the same size, resulting in a final output of $12^4$ tensor. The Jacobian automatic differentiation requires to keep all intermediate partial derivatives. Therefore, for each tensor contraction the memory requirement is $O(12^8)$. For just one Jacobian, almost 3.5 GB memory is required, making the task impossible given that several Jacobians of the same size are needed for the above example. An alternative method herein referred to as "tensor network reverse-mode differentiation" was suggested by a recent non-patent publication Gorodetsky, et al. *"Reverse-mode differentiation in arbitrary tensor network format: with application to supervised learning." Journal of Machine Learning Research*, 23, 2022. where a single tensor contraction over s dimensions of two given tensors is broken down into s single tensor contractions and using an equivalent tensor network representation, the tensor gradients were computed. There are a few shortcomings with the cited tensor network reverse-mode differentiation: First, Gorodetsky et al. (2020) reported that the time complexities of the tensor network reverse-mode differentiation for two d-way tensors contracting over s dimension were asymptotically $O(sI^{2d})$ where I is the maximum dimension size of the contracted tensors. However, we know that the time complexities of evaluation of contracting two such tensors are asymptotically $O(I^{2d-s})$ and theoretically one expects the same time complexities for differentiation if the differentiation is done most efficiently. So, the cited tensor network reverse-mode differentiation is not efficient. Furthermore, the tensor network reverse-mode differentiation does not provide an automatic differentiation for tensor models that involves other tensor operations. Therefore, the cited tensor network reverse-mode differentiation does not teach us how to compute the tensor gradients for an arbitrary tensor model and therefore it lacks adaptability. In general, current state-of-the art methods for computing tensor gradients fall on a spectrum. At one end of this spectrum is Jacobian automatic differentiation, which offers the most adaptability and versatility while pose one of the highest levels of inefficiency for high dimensional arrays. At the other end is a hypothetically efficient custom design that is tailored to a specific model and is not adaptable. Other methods fall somewhere between the two ends on the defined spectrum compromising versatility for efficiency or vice versa. The disclosed embodiment provides the best of both ends of this spectrum including the lowest theoretical asymptotical time and memory complexities and the highest level of adaptability and versatility to compute tensor gradients for tensor contractions and for any arbitrary tensor model automatically and efficiently.

BRIEF DESCRIPTION OF THE DRAWINGS

The features and advantages of the present embodiment will be better understood by reference to the following detailed description of the disclosed embodiment when considered in connection with the accompanying drawings wherein.

DETAILED DESCRIPTION

Figure 1:
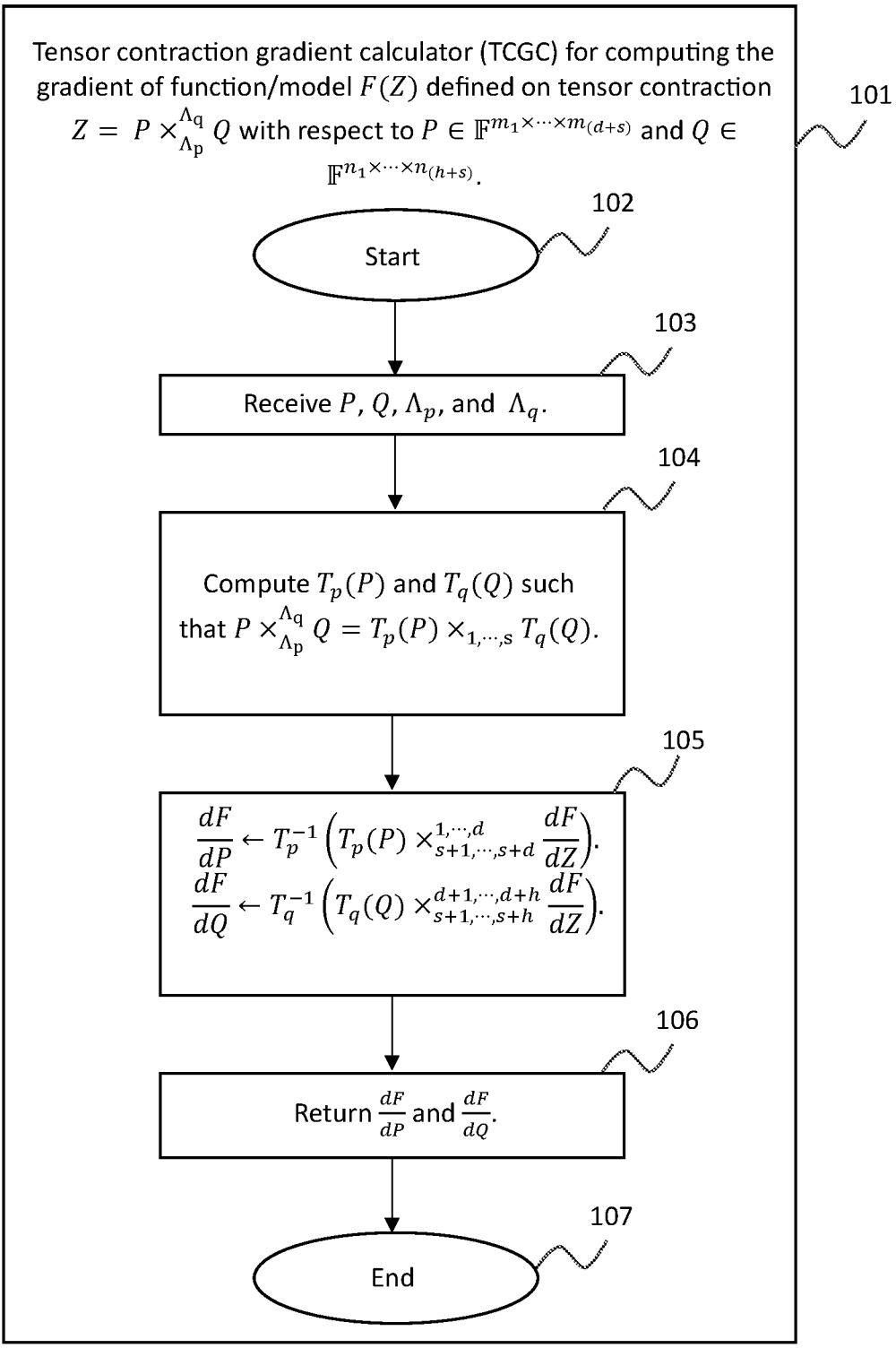
FIG. 1 illustrates a flowchart of tensor contraction gradient calculator (TCGC) for computing the gradient of a function/model defined on a tensor contraction.

Referring to the drawings, FIG. 1 depicts a flowchart of one instance of the tensor contraction gradient calculator (TCGC) 101 of the disclosed embodiment that computes the tensor gradients of a model or function defined on a tensor contraction of two arbitrary tensors with respect to the contracting tensors. From the prior art, the tensor contraction of two arbitrary tensors like $P \in \mathbb{F}^{m_1 \times \cdots \times m_{(d+s)}}$ and $Q \in \mathbb{F}^{n_1 \times \cdots \times n_{(h+s)}}$ is defined as follows:

$$Z = P \times_{\Lambda_p}^{\Lambda_q} Q \qquad (1)$$

where $Z \in \mathbb{F}^{l_1 \times \cdots \times l_{(d+h)}}$ is the tensor product, $\Lambda_q = f_q(1, \ldots, h+s)_1^s$, and $\Lambda_p = f_p(1, \ldots, d+s)_1^s$ where $f: \mathbb{Z}^{+^k} \to \mathbb{Z}^{+^k}$ is a one-to-one mapping such that $i_{\phi_1}, \ldots, i_{\phi_k} = f(i_1, \ldots, i_k)$ where $\Phi = \{\phi_1, \ldots, \phi_k\}$ is a permutation of set $\{1 | l \leq k, k \in \mathbb{Z}^+\}$ for some k. $f_p$ and $f_q$ are two different instances of function $f$. In other words, $\Lambda_p$ and $\Lambda_q$ are sets that denotes the corresponding dimensions of the contracting tensors P and Q, respectively. In the special case that both tensors are contracted along the same dimensions where $\Lambda_p = \Lambda_q = \Lambda$, the tensor contraction is briefly written as $Z = P \times_\Lambda Q$. Let us refer to the special case, where the first s axes of both tensors are contracted ($\Lambda = 1, \ldots, s,$), as a "double frontal tensor contraction". From the prior art, in the special case that both tensors are contracted over their first s axes, tensor contraction of two arbitrary tensors like $P \in \mathbb{F}^{l_1 \times \cdots \times l_s \times m_1 \times \cdots \times m_d}$ and $Q \in \mathbb{F}^{l_1 \times \cdots \times l_s \times n_1 \times \cdots \times n_d}$ is defined as below:

$$Z = P \times_{1, \ldots, s} Q \qquad (2)$$

where:

$$[Z]_{i_1, \ldots, i_d, j_1, \ldots, j_h} = \Sigma_{t_1, \ldots, t_s}([P]_{t_1, \ldots, t_s, i_1, \ldots, i_d} [Q]_{t_1, \ldots, t_s, j_1, \ldots, j_h}), \forall i_1, \ldots, i_d, j_1, \ldots, j_h \qquad (3)$$

where $Z \in \mathbb{F}^{m_1 \times \cdots \times m_d \times n_1 \times \cdots \times n_h}$ and $[Z]_{i_1, \ldots, i_d, j_1, \ldots, j_h}$ refers to the element $i_1, \ldots, i_d, j_1, \ldots, j_h$ of tensor Z.

Any arbitrary tensor contraction can be equivalently written by an equivalent tensor contraction particularly a double frontal tensor contraction using an appropriate permutation of the dimensions of the contracted tensors. In the TCGC 101 of the disclosed embodiment $T_p$ and $T_q$ 104 are transformations such that they do not alter the tensor product of an equivalent double frontal tensor contraction for all possible values of P and Q as below:

$$P \times_{\Lambda_p}^{\Lambda_q} Q = T_p(P) \times_\Lambda T_q(Q) \qquad (4)$$

where $\Lambda = 1, \ldots, s$.

The disclosed TCGC receives values of tensors P and Q along with $\Lambda_p$ and $\Lambda_q$ 103 and computes the tensor gradients of F (Z) with respect to $T_p(P)$, denoted by $$\frac{dF}{dT_p(P)},$$

and $T_q(Q)$, denoted by $$\frac{dF}{dT_q(Q)},$$

referred to as auxiliary tensor gradients. Theses auxiliary tensor gradients are used to obtain the tensor gradients of F (Z) with respect to P, denoted by $$\frac{dF}{dP},$$

and Q, denoted by $$\frac{dF}{dQ},$$

respectively 105. In other words, tensor gradients of the original contracting tensors are functions of the invers transformations of the tensor gradients of the transformed tensors. In one instance of the disclosed TCGC 101, transformed tensors, $T_p(P)$ and $T_q(Q)$, are defined as follows:

$$[T_p(P)]_{i_1, \ldots, i_{(d+s)}} = [P]_{f_p^{-1}(i_1, \ldots, i_{(d+s)})} \qquad (5)$$

$$[T_q(Q)]_{i_1, \ldots, i_{(h+s)}} = [Q]_{f_q^{-1}(i_1, \ldots, i_{(h+s)})} \qquad (6)$$

Note that the disclosed example is one instance of the disclosed TCGC. Other transformations including linear and non-linear transformations may be applied. In addition, transformation may scale or adjust the values of the contracted tensors which for instance may be used to avoid overflow or change the data format among other necessary adjustments.

The above definitions of $T_p(P)$ and $T_q(Q)$ satisfy the necessary condition defined in equation (4). These transformations allow the TCGC 101 of the disclosed embodiment be able to compute the tensor gradients of any arbitrary tensor contraction using the tensor differentiation of a double frontal tensor contraction without altering or adopting the evaluation phase (forward pass) of a tensor model.

In one instance where $T_p(P)$ and $T_q(Q)$ are defined by equations (5) and (6), respectively, the disclosed TCGC 101 computes the tensor gradients of F(Z) with respect to the $T_p(P)$ and $T_q(Q)$ 105 called auxiliary tensor gradients as follows:

$$\frac{dF}{dT_P(P)} = T_q(Q) \times_{s+1, \ldots, s+h}^{d+1, \ldots, d+h} \frac{dF}{dZ} \qquad (7)$$

$$\frac{dF}{dT_q(Q)} = T_p(P) \times_{s+1, \ldots, s+d}^{1, \ldots, d} \frac{dF}{dZ} \qquad (8)$$

Finally, in one instance of the disclosed TCGC 101 where $T_p(P)$ and $T_q(Q)$ are defined by equations (5) and (6), the tensor gradients of F(Z) with respect to the P and Q denoted by $$\frac{dF}{dP}$$

and $$\frac{dF}{dQ},$$

respectively, are computed 105 as follows:

$$\frac{dF}{dP} = T_p^{-1}\left(\frac{dF}{dT_p(P)}\right) \quad (9)$$

$$\frac{dF}{dQ} = T_q^{-1}\left(\frac{dF}{dT_q(q)}\right) \quad (10)$$

where $T_p^{-1}$ and $T_q^{-1}$ are inverse of $T_p$ and $T_q$, respectively. Note that after the tensor gradients $$\frac{dF}{dP}$$

and $$\frac{dF}{dQ}$$

are computed they may be further modified including being scaled, reshaped, or adjusted.

To clarify how the disclosed TCGC computes tensor gradients of a tensor contraction, consider an instance of the disclosed method where $\Lambda_p = \Lambda_q = 1, \ldots, s$. Therefore, based on the definitions of $T_p$ and $T_q$ by equations (5) and (6), respectively, we have: $T_p(P)=P$ and $T_q(Q)=Q$ 104. From the prior art for such a case, every entry of $$\frac{dF}{dP}$$

and $$\frac{dF}{dQ}$$

can be individually computed as below:

$$\left[\frac{dF}{dP}\right]_{t_1,\ldots,t_S,i_1,\ldots,i_d} = \sum_{j_1,\ldots,j_h}\left[\frac{dF}{dZ}\right]_{i_1,\ldots,i_d,j_1,\ldots,j_h} \frac{\partial[Z]_{i_1,\ldots,i_d,j_1,\ldots,j_h}}{\partial[P]_{t_1,\ldots,t_S,i_1,\ldots,i_d}}, \quad (11)$$

$$\forall t_1, \ldots, t_S, i_1, \ldots, i_d.$$

$$\left[\frac{dF}{dQ}\right]_{t_1,\ldots,t_S,j_1,\ldots,j_h} = \quad (12)$$

$$\sum_{i_1,\ldots,i_d}\left[\frac{dF}{dZ}\right]_{i_1,\ldots,i_d,j_1,\ldots,j_h} \frac{\partial[Z]_{i_1,\ldots,i_d,j_1,\ldots,j_h}}{\partial[Q]_{t_1,\ldots,t_S,j_1,\ldots,j_h}},$$

$$\forall t_1, \ldots, t_S, j_1, \ldots, j_h.$$

The inventor noticed that the tensor gradients $$\frac{dF}{dP}$$

and $$\frac{dF}{dQ}$$

can be equivalently computed by tensor contractions between the contracting tensors and the tensor gradient of the product, $$\frac{dF}{dZ}.$$

For instance, tor a double frontal tensor contraction $T_p(P) \times_{1,\ldots,s} T_q(Q)$, the tensor gradient of $T_p(P)$ is equal to a tensor contraction between $T_q(Q)$ and $$\frac{dF}{dZ}$$

over non-contracting dimensions of $T_q(Q)$ and corresponding dimensions of $$\frac{dF}{dZ}.$$

In other words, tor a double frontal tensor contraction, the tensor gradient of one of the contracting tensors is equal to a tensor contraction between the other contracting tensor and the tensor product's gradient referring to equations (7) and (8).

In another instance of the disclosed method where $T_p(P) \neq P$ or $T_q(Q) \neq Q$, and $T_p$ and $T_q$ are defined in equations (5) and (6), respectively, we can show that $$\frac{dF}{dP} = T_p^{-1}\left(\frac{dF}{dT_p(P)}\right)$$

as below:

$$\frac{dF}{dP} = T_p^{-1}\left(\frac{dF}{dT_p(P)}\right) \quad (13)$$

$$T_p\left(\frac{dF}{dP}\right) = \frac{dF}{dT_p(P)} \quad (14)$$

$$\left[T_p\left(\frac{dF}{dP}\right)\right]_{t_1,\ldots,t_S,i_1,\ldots,i_d} = \left[\frac{dF}{dT_p(P)}\right]_{t_1,\ldots,t_S,i_1,\ldots,i_d} \quad (15)$$

-continued
$$\left[\frac{dF}{dP}\right]_{f_p^{-1}(t_1,\ldots,t_s,i_1,\ldots,i_d)} = \left[\frac{dF}{dT_p(P)}\right]_{t_1,\ldots,t_s,i_1,\ldots,i_d} \quad (16)$$

Given $T_p$ was defined such that the condition in equation (4) is met for all values of P, and $T_p$ only applies a permutation of dimensions, it does not alter the order of $i_1, \ldots, i_d$. Therefore, we have:

$$\sum_{j_1,\ldots,j_h}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[P]_{f_p^{-1}(t_1,\ldots,t_s,i_1,\ldots,i_d)}} = \quad (17)$$

$$\sum_{j_1,\ldots,j_h}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[T_p(P)]_{t_1,\ldots,t_s,i_1,\ldots,i_d}}$$

where by the definition of $T_p$ in equation (5) we have:

$$\sum_{j_1,\ldots,j_h}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[T_p(P)]_{t_1,\ldots,t_s,i_1,\ldots,i_d}} = \quad (18)$$

$$\sum_{i_1,\ldots,i_d}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[T_p(P)]_{t_1,\ldots,t_s,i_1,\ldots,i_d}}$$

Similarly, we can show that $$\frac{dF}{dQ} = T_q^{-1}\left(\frac{dF}{dT_q(Q)}\right)$$

as below:

$$\frac{dF}{dQ} = T_q^{-1}\left(\frac{dF}{dT_q(Q)}\right) \quad (19)$$

$$T_q\left(\frac{dF}{dQ}\right) = \frac{dF}{dT_q(Q)} \quad (20)$$

$$\left[T_q\left(\frac{dF}{dQ}\right)\right]_{t_1,\ldots,t_s,j_1,\ldots,j_h} = \left[\frac{dF}{dT_q(Q)}\right]_{t_1,\ldots,t_s,j_1,\ldots,j_h} \quad (21)$$

$$\left[\frac{dF}{dQ}\right]_{f_q^{-1}(t_1,\ldots,t_s,j_1,\ldots,j_h)} = \left[\frac{dF}{dT_q(Q)}\right]_{t_1,\ldots,t_s,j_1,\ldots,j_h} \quad (22)$$

Given $T_q$ was defined such that the condition in equation (4) is met for all values of Q, and $T_q$ only applies a permutation of dimensions, it does not alter the order of $j_1, \ldots, j_h$. Therefore, we can write:

$$\sum_{i_1,\ldots,i_d}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[Q]_{f_q^{-1}(t_1,\ldots,t_s,j_1,\ldots,j_h)}} = \quad (23)$$

$$\sum_{i_1,\ldots,i_d}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[T_q(Q)]_{t_1,\ldots,t_s,j_1,\ldots,j_h}}$$

where by the definition of $T_q$ in equation (6) we have:

$$\sum_{i_1,\ldots,i_d}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[T_q(Q)]_{t_1,\ldots,t_s,j_1,\ldots,j_h}} = \quad (24)$$

-continued
$$\sum_{i_1,\ldots,i_d}\left[\frac{dF}{dZ}\right]_{i_1,\ldots,i_d,j_1,\ldots,j_h}\frac{\partial[Z]_{i_1,\ldots,i_d,j_1,\ldots,j_h}}{\partial[T_q(Q)]_{t_1,\ldots,t_s,j_1,\ldots,j_h}}$$

In summary, the disclosed TCGC computes the tensor gradients of contracting tensors for any given arbitrary tensor contraction without the need for modifying or redefining the contraction in the function/model evaluation mode. Meanwhile for a tensor model which includes tensor contractions, the disclosed method eliminates the need to compute and store Jacobians or partial derivatives explicitly to update the tensor gradients through differentiation tape or graph. Instead, the disclosed TCGC computes the tensor gradient of a contracting tensor as a function of a contraction between a transformation of the other contracting tensor and the propagated tensor gradient of the tensor product. This leads to a significant reduction of the associated memory and time complexities for tensor models. The disclosed TCGC results in time and memory complexities asymptotically equal to the evaluation mode for composite tensor contractions. Furthermore, with capability of computing tensor gradients though a tensor contraction between the tensor gradient of the product and a transformation of the contracting tensors, the tensor contraction operation can be considered as a pseudo elementary tensor operation that facilitates development of a computational model for tensor automatic differentiation. Therefore, the disclosed TCGC becomes an advantageous tool for computing the gradients of tensors for any arbitrary tensor model automatically and efficiently.

Figure 2:
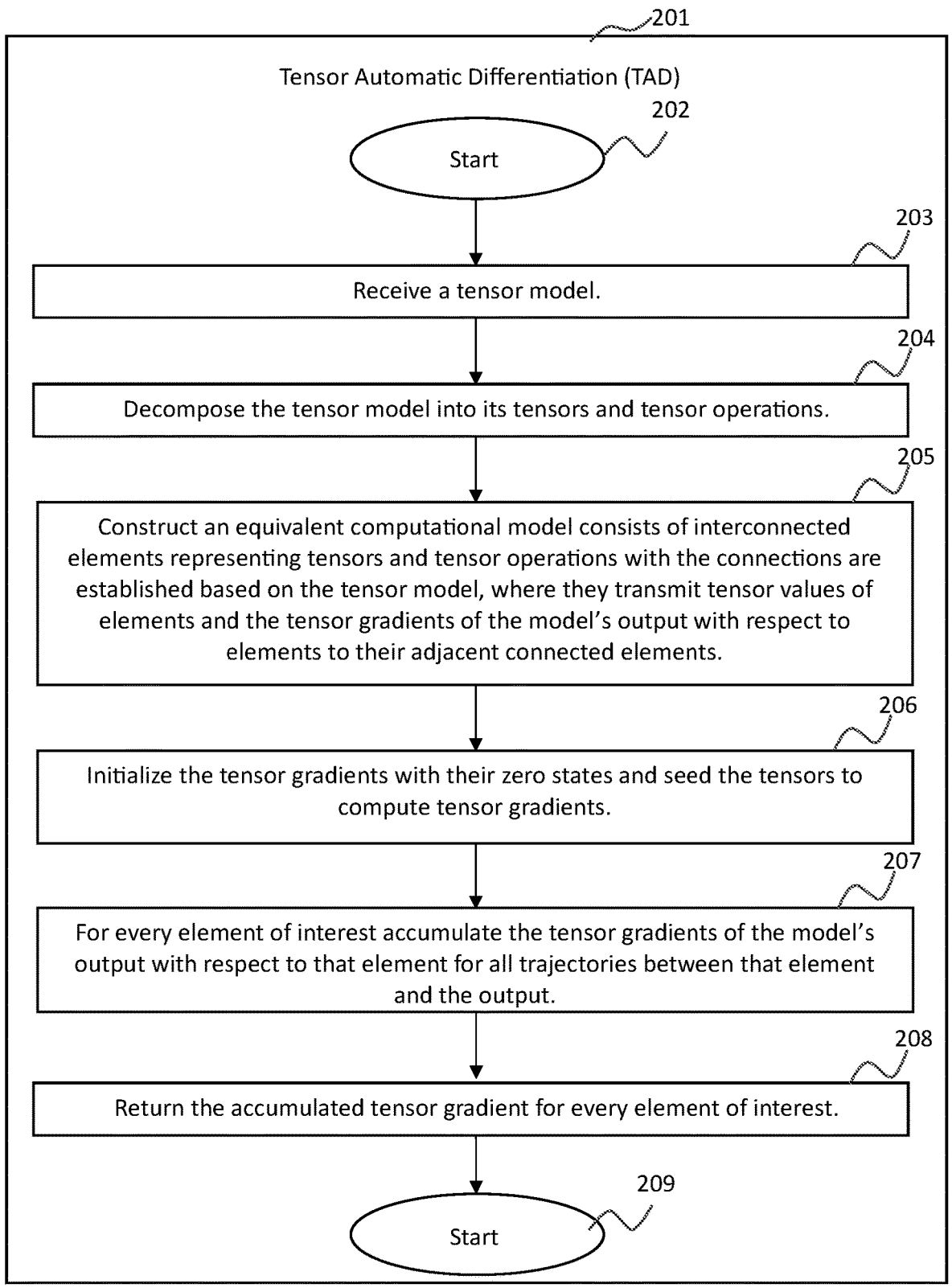
FIG. 2 depicts a flowchart of an instance of the tensor automatic differentiation (TAD) of the disclosed embodiment that computes tensor gradients for an arbitrary given tensor model.

FIG. 2 depicts a flowchart of an instance of the tensor automatic differentiation (TAD) 201 of the disclosed embodiment that computes tensor gradients for an arbitrary given tensor model using tensor gradient propagation. The disclosed method receives a tensor model 203 comprises of one or more (variable or constant) tensors and one or more tensor operations including tensor contractions and elementary tensor operations including addition/subtraction, tensor multiplication, and elementwise functions. Next, the tensor model is decomposed into its tensor operations 204 and an equivalent computational model is constructed where every element of the model represents a tensor or a tensor operation 205. The elements are connected such that the flow of data begins with tensors and progresses toward the output of the computational model correctly simulates the tensor model 205. Each connection in the model dynamically transmits the tensor gradient of the model's output with respect to an element to its adjacent connected element for every trajectory between that element and the model's output 205. After a computational model including its elements and their connections are established, the tensor gradients are set to their zero states, and the tensors are seeded to compute the tensor gradients 206. For every element of interest, the tensor gradients of the graph's output with respect to that element are accumulated over all available trajectories between the element of interest and the output 207. Finally, the accumulated tensor gradients are reported for the elements of interest 208. If multiple updates are required, as is common in gradient-based optimization methods and applications such as machine learning, neural networks, tensor completion, tensor decomposition, quantum circuit design, systems modeling, and other scientific computations, the computational model is seeded with updated tensor values while resetting the tensor gradients to their zero state to compute new tensor gradients as disclosed above. This process repeats until some convergence criteria are met.

In the disclosed TAD, a tensor operation is defined elementary if the tensor gradient of a function of the tensor operation with respect to one of the tensor operands is obtained by an elementary tensor operation defined on, at minimum, the tensor gradient of the function with respect to the elementary tensor operation's output. Meanwhile, the tensor gradient of a function defined on a tensor contraction, which is defined on some contracting tensors, with respect to one of the contracting tensors is equal to an inverse transform of some auxiliary tensor gradients, where the auxiliary tensor gradients are equal to a tensor contraction defined on some transformation of the contracting tensors and tensor gradients of the function with respect to the product of the tensor contraction. Furthermore, in the computational model of the disclosed TAD, an element may represent a single tensor operation or a combination or a composite function of elementary tensor operations and tensor contractions. In the disclosed TAD, a computational element is designed to possess information and methods to read, compute, and return associated values to tensors or tensor operations they represent including tensor values, tensor operations, and tensor gradients along other required instructions. Meantime, an element may comprise computational components or share resources with other elements in the computational model to perform its assigned tasks. In the disclosed TAD, if the tensor model has more than one output, the computational model also has more than one output. In such a case the tensor gradients from every output may be stored individually, accumulated, or a function of them computed, depending on the scope and objectives of the tensor model and tensor automatic differentiation.

Note that in the prior art of automatic differentiation, the elements of the associated computational model were fundamentally defined on scalar variables and elementary scalar operations, and differentiation depends on explicitly computing partial derivatives. The TAD of the disclosed embodiment replaces the traditional scalar notion with tensors and constructs a computational model in which every element presents either a tensor or a tensor operation. In the TAD of the disclosed embodiment, the connections transmit the tensor gradients of the graph's output with respect to an element whereas in a model of traditional (Jacobian) automatic differentiation each element computes and returns Jacobians (partial derivatives) between two adjacent elements. In the disclosed embodiment, every time a tensor is encountered while traversing through the TAD computational model, its gradient gets updated by storing and propagating intermediate tensor gradients instead.

Figure 3:
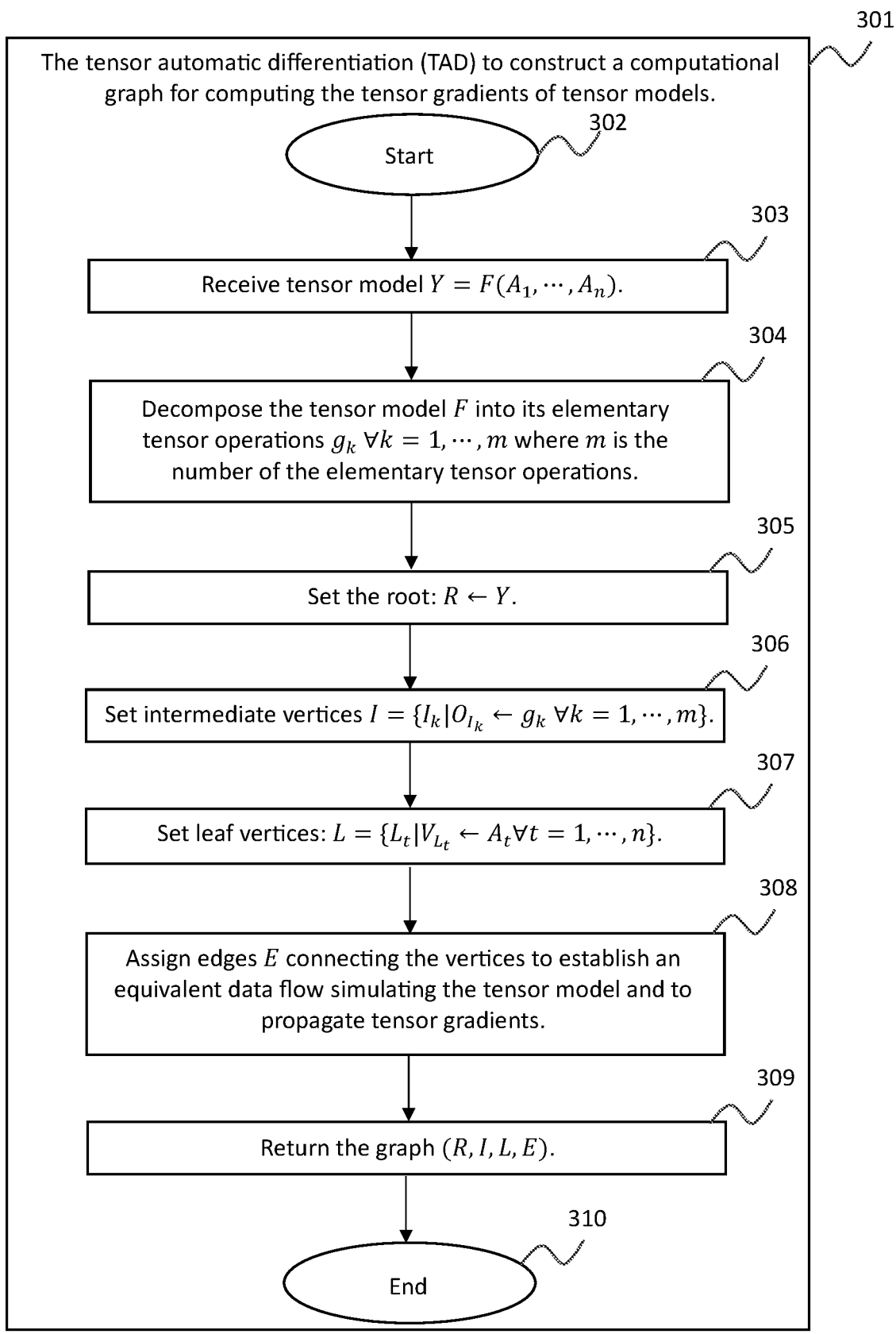
FIG. 3 depicts a flowchart of an instance of the disclosed TAD that constructs a tensor differentiation computational graph for a given tensor model.

FIG. 3 depicts a flowchart of an instance of the disclosed TAD 301 that constructs a tensor differentiation computational graph for a given tensor model like $Y=F(A_1, \ldots, A_n)$ 303 where Y is the output, F is a tensor model defined on a set of tensors $A_1, \ldots, A_n$ for some n. The received tensor model is decomposed to its tensor operations 304 including tensor contraction, tensor addition/subtraction, tensor multiplication, and elementwise functions. An equivalent computational graph is constructed. The root is assigned to the output of the model 305. If we assume the tensor model can be decomposed into m tensor operations like $g_k \forall k=1, \ldots, m$, then, m intermediate vertices are defined 306 where each intermediate vertex $I_k \forall k=1, \ldots, m$ is assigned a tensor operation $O_{I_k}=g_k \forall k=1, \ldots, m$. The leaf vertices of the graph represent the input (variable) tensors 307 whose gradients are requested. The placeholder for values of leaf nodes ($V_{L_i}$) is set based on the tensors $A_1, \ldots, A_n$ of the given tensor model F 307. Next, edges E connecting the vertices according to the tensor model to establish data flow and dependencies are established 308. Finally, the graph (R, I, L, E) is returned 309.

Although the tensor contraction is the dominant operation in many tensor models like tensor networks and tensor decompositions, a tensor model may include other operations. The evaluation of a function defined on a tensor contraction is presented in equation (1) and its gradients are computed by the disclosed TCGC. Other instances of elementary tensor operations adopted in the disclosed embodiment are tensor addition or subtraction, tensor multiplication, and elementwise functions. These operations and their differentiation in principle are prior art. What is the novelty here is how to compute the gradients of a tensor model with respect to its tensors in the context of tensor automatic differentiation and how to flow the necessary gradient information through the connections of a computational model efficiently when various tensor operations including tensor contractions and elementary tensor operations are encountered at different vertices. In the following to clarify how the function evaluation data and gradient information flow through the computational graph of the disclosed TAD, the evaluation and tensor gradient of some instances of elementary tensor operations that are adopted in the disclosed embodiment are presented.

From the prior art, a tensor addition/subtraction is defined as below:

$$Z=A\pm B \tag{25}$$

where $[Z]_{i_1, \ldots, i_n}=[A]_{i_1, \ldots, i_n}\pm[B]_{i_1, \ldots, i_n}$ and Z, A, $B \in \mathbb{F}^{l_1 \times \cdots \times x_n}$, for some n.

The differentiation of a function like F(Z), which is defined on an elementary tensor addition where Z=A+B, is adopted in the disclosed embodiment as below:

$$\frac{dF}{dA} = \frac{dF}{dZ} \tag{26}$$

$$\frac{dF}{dB} = \frac{dF}{dZ} \tag{27}$$

The differentiation of a function like F(Z), which is defined on an elementary tensor subtraction where Z=A−B, is adopted in the disclosed embodiment as below:

$$\frac{dF}{dA} = \frac{dF}{dZ} \tag{28}$$

$$\frac{dF}{dB} = -\frac{dF}{dZ} \tag{29}$$

From prior art, another elementary tensor operation is elementwise tensor multiplication defined below:

$$Z=A\odot B \tag{30}$$

Where $Z, A, B \in \mathbb{F}^{l_1 \times \cdots \times x_n}$, and the operation $\odot$ denotes Hadamard product, that is elementwise multiplication of tensors.

The differentiation of a function like F(Z), which is defined on an elementary tensor multiplication where $Z=A\odot B$, is adopted in the disclosed embodiment as below:

$$\frac{dF}{dA} = \frac{dF}{dZ} \odot B \tag{31}$$

$$\frac{dF}{dB} = \frac{dF}{dZ} \odot A \qquad (32)$$

Other instances of elementary tensor operations are elementwise functions. Examples of elementwise functions are equality, multiplication by a scalar, logarithmic and exponential functions, absolute values, root functions, reciprocal, reduction functions such as norms, and basically any function that receive a tensor and operate on all elements of the given tensor to generate the output. As adopted in the disclosed embodiment, an elementwise function does not necessarily need to do the same exact operation over all elements if its derivative is well defined. For instance, a function that multiply every element of a tensor by a uniquely generated random number can be an example of an elementwise function. The differentiation of a function like F(Z) which is defined on an elementwise function like Z=H(A) is adopted in the disclosed embodiment as written below:

$$\frac{dF}{dA} = H'(A) \odot \frac{dF}{dZ} \qquad (33)$$

where H': $\mathbb{F}^{dim(A)} \rightarrow \mathbb{F}^{dim(Z)}$ denotes the derivative of the elementwise function H, and dim(A) returns the set of dimension sizes of tensor A. An elementwise function like Z=H (A) as adopted in the disclosed embodiment may be such that dim(A) be greater, equal, or smaller than dim(Z). Meanwhile, the first derivative denoted by H' must be defined such that the dimensionality and dimension sizes of its domain and range matches those of H and be equal to dim(A) and dim(Z), respectively. Any such function is adoptable in the disclosed embodiment as an elementwise function. In addition to common well-known functions, custom functions can be adopted in the disclosed embodiment if they follow said criteria.

Note that as presented above, in the disclosed embodiment, no partial derivatives are computed or required during the tensor automatic differentiation. This feature sets the disclosed embodiment apart from the prior art in automatic differentiation.

Figure 4:
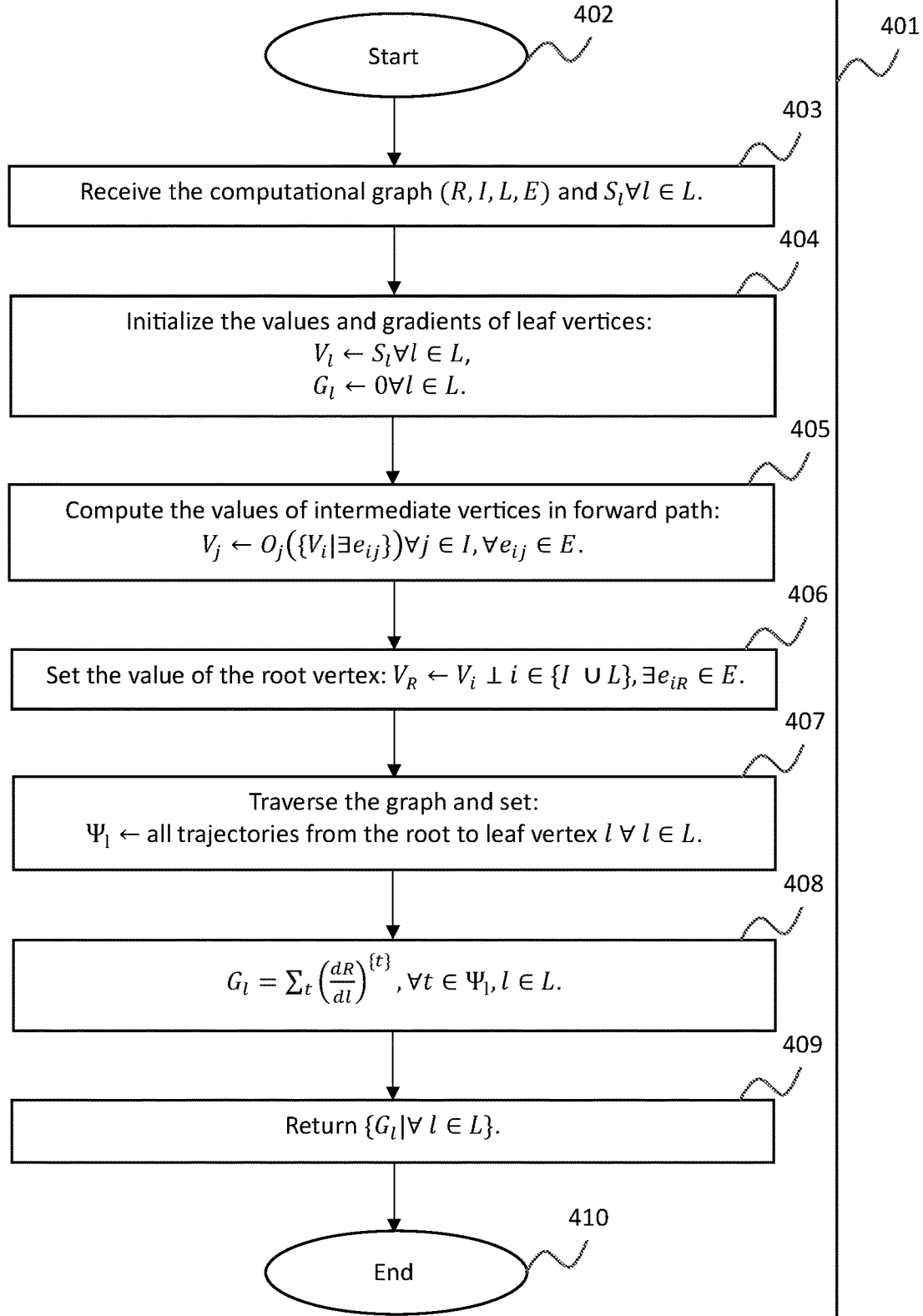
FIG. 4 depicts a flowchart of one instance of the disclosed TAD, demonstrating the computation of tensor gradients using a tensor differentiation computational graph in reverse-mode.

FIG. 4 depicts a flowchart of one instance of the disclosed TAD 401, demonstrating the computation of tensor gradients using a tensor differentiation computational graph in reverse-mode. The received computational graph comprises sets of vertices, including root, intermediate, and leaf vertices, denoted by R, I, and L, respectively, along with a set of edges denoted by E, determining the connections between the vertices 403. Additionally, initial values for the leaf vertices ($S_l, \forall l \in L$) are received 403. The values ($V_l$) and tensor gradient ($G_l$) of leaf vertices ($l \in L$) are initialized 404. Next, the values of intermediate vertices ($V_j, \forall j \in I$) are computed by propagating data from leaf vertices toward the root, continuing until the value of the root becomes available 405. $O_j$ refers to the tensor operation of intermediate vertices $j \in I$ 405. The graph is traversed to find the trajectories from the root to the leaf vertices 407. One method to extract the trajectories involves a recursion using a pre-order depth-first search (DFS) strategy. For each leaf vertex, the value of tensor gradient is the accumulation of the propagated tensor gradients of the root with respect to that leaf arriving from all trajectories between the leaf vertex and the root 408. The disclosed system returns the tensor gradient for every leaf vertex. Note that if the tensor gradient of a vertex other than leaf vertices is of interest, similar to leaf vertices, the tensor gradient of the root with respect to the vertex of interest is computed by accumulating all tensor gradients arriving at that vertex from different trajectories between the vertex of interest and the root. Meanwhile, the order applied, as shown in FIG. 4, is not necessarily required to achieve the desired results. For instance, the trajectories may be discovered prior to initialization. Furthermore, a recursion can be applied to find trajectories and accumulate the tensor gradients, simultaneously. The depth-first search strategy is only one example of methods or techniques for finding trajectories within the tensor differentiation computational graph and any other method that can find the trajectories between two nodes of a graph can be adopted. Although a computational graph has been adopted, other computational models that provide the same hierarchical functionality to decompose the tensor model into its elementary tensor operations and allow data flow from the input tensors to generate the output of the tensor model can be adopted in the disclosed embodiment. Furthermore, if one or several of input tensors are constant or their tensor gradients are not of interest, their gradients may be ignored or skipped.

Figure 5:
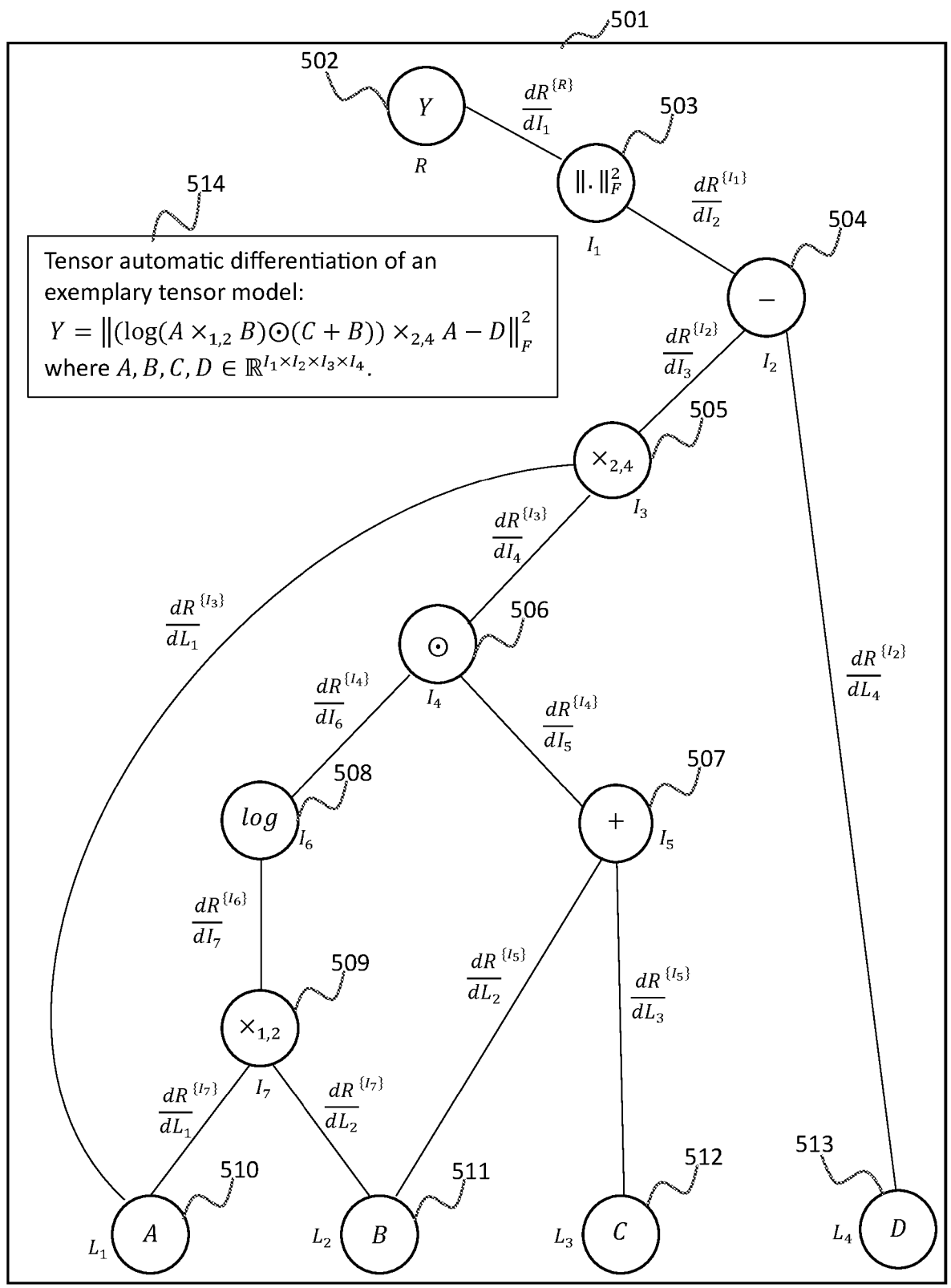
FIG. 5 depicts an instance of the application of the TAD of the disclosed embodiment for automatic differentiation of an exemplary tensor model.

FIG. 5 depicts an instance of the application of the TAD of the disclosed embodiment for automatic differentiation of an exemplary tensor model written below:

$$Y = \|(\log(A \times_{1,2} B) \odot (C+B)) \times_{2,4} A - D\|_F^2 \qquad (34)$$

where A, B, C, D $\in \mathbb{R}^{I_1 \times I_2 \times I_3 \times I_4}$ are 4-way real-valued tensors.

The equivalent tensor automatic differentiation graph 501 has four leaf vertices including $L_1$ 510, $L_2$ 511, $L_3$ 512, and $L_4$ 513, representing tensors A, B, C, and D, respectively, along with seven intermediate vertices each of which refers to a tensor operation 502-509. In this example, the tensor gradient of the tensors A, B, C, and D according to the graph 501 and the disclosed system 401 are computed as below:

$$\frac{dY}{dA} = \frac{dR^{\{I_3\}}}{dL_1} + \frac{dR^{\{I_7\}}}{dL_1} \qquad (35)$$

$$\frac{dY}{dB} = \frac{dR^{\{I_5\}}}{dL_2} + \frac{dR^{\{I_7\}}}{dL_2} \qquad (36)$$

$$\frac{dY}{dC} = \frac{dR^{\{I_5\}}}{dL_3} \qquad (37)$$

$$\frac{dY}{dD} = \frac{dR^{\{I_2\}}}{dL_4} \qquad (38)$$

In this example, if tensor D is assumed to be a constant tensor, then $$\frac{dY}{dD}$$

is ignored (skipped). This example demonstrates the functionality of the disclosed embodiment in automatic differentiation of arbitrary tensor models involving various operations of tensor contractions, addition/subtractions and elementwise operations along with repeated tensors. Also, this example depicts the flow of tensor gradients propagated through the graph 501 in reverse-mode.

Figure 6:
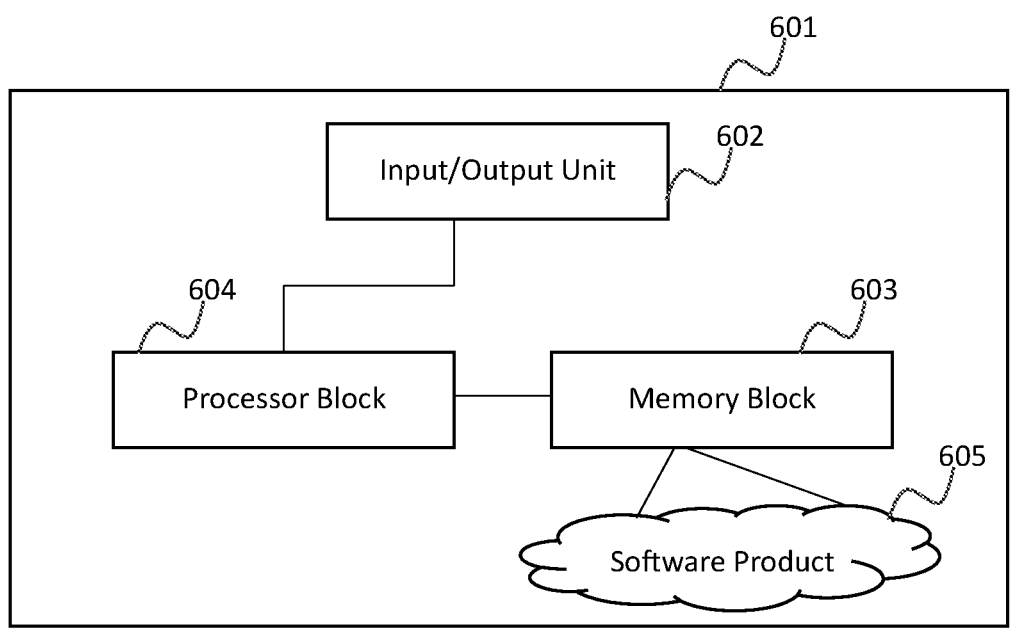
FIG. 6 illustrates the diagram of a computational device which is programmed to operate as the disclosed tensor automatic differentiation (TAD) to construct and execute the associated computational model of the disclosed embodiment.

FIG. 6 depicts a diagram of an instance of a computational device 601 which is programmed to operate as the disclosed tensor automatic differentiation (TAD) to construct and execute the associated computational model of the disclosed embodiment. One instance of such device is a traditional computer. The Input/Output unit 602, includes data entry devices in the form of keyboard and pointing devices and output devices in the form of display to facilitate the user interface to receive the data of a tensor model and to provide access to the computed tensor gradients. The data entry and output devices are connected to a processor block, which includes at least one central processing unit (CPU) and may also feature graphic processing units (GPUs) or field-programmable gate arrays (FPGAs) attachments. The CPU interacts with the memory block that includes random access memory (RAM) and storage devices, in the form of hard drives or solid-state drivers (SSDs) that carries instructions for execution by the processor block. The instructions constitute a software product that when executed configures the processor block to operate as a tensor automatic differentiation system and in particular to implement the disclosed embodiment to construct the TAD computational graph referring to FIG. 3 and to execute the computational graph referring to FIG. 4. It will be realized by those skilled in the art that the programming of software product is straightforward given the methods of the disclosed embodiment. Furthermore, the Input/Output unit 602 can be a machine-machine communication utilizing interfaces such as peripheral component interconnect express (PCIe), or other communication protocols that allow extensions such as external GPUs, FPGAs, digital signal processors (DPSs), and AI accelerators being utilized to employ the disclosed embodiment.

To demonstrate the computational advantage of the disclosed embodiment, an experiment was conducted to compute tensor gradients for a composite tensor contraction involving three 4-way tensors, each with dimension sizes equal to k, in a 32-bit floating-point representation where each pair of tensor are contracted over two dimensions. The experiment was executed on a GPU with 8 GB (8 Gigabyte) memory. In one implementation of the disclosed embodiment, the disclosed tensor automatic differentiation successfully computed the tensor gradients for up to k=100 whereas the Jacobian automatic differentiation exhausted almost the same amount of memory at k=100 and was not able to conduct differentiation for k>11. Comparing the total size of the contracted tensors the disclosed tensor automatic differentiation outperformed the Jacobian automatic differentiation by a factor of more than 6,800 times for memory utilization. The same experiment on a 2.6 GHz CPU, for k=7, one instance of the disclosed tensor automatic differentiation computed tensor gradients more than 1,000 times faster than the Jacobian-based automatic differentiation. Note that these experiments serve as examples of the disclosed embodiment and the performance and computational gain may vary depending on efficiency of the programming language, type of the hardware, and other software or hardware influential factors in different implementations of the disclosed embodiment. The results of the experiments were reported solely to showcase the advantages of the disclosed embodiment and to demonstrate its effectiveness.

The disclosed embodiment may scale tensor gradients during the propagation of tensor gradients. Various scaling methods, including logarithmic scaling, normalization, z-score scaling, min-max scaling, softmax functions, floating-point precision adjustment, and adaptive scaling or similar techniques can be applied to adjust tensor gradients while propagating.

Meanwhile here a limited number of elementwise functions and elementary tensor operations were disclosed. Other elementwise functions or custom elementary tensor operations including reshaping, concatenation, absolute values, reciprocals, polynomials, geometric functions and basically any differentiable function for which a derivative function can be defined, can be added to the elementary tensor operations of the disclosed embodiment.

A few variations have been described in detail above, but other modifications or additions are possible. Particularly, extra features and/or variations may be provided in addition to those set forth herein. Additionally, different disclosed embodiments may be combined with one another. Moreover, the example embodiments disclosed above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims. Similarly, while operations are depicted in the drawings or described in the presented order, this should not be understood as requiring that such operations be performed in the particular order shown or descried or in sequential order, or that all operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document. The instances of the disclosed embodiment presented herein are provided to describe its principles and they are not to be understood as limiting or restricting the invention since many modifications may be made without departing from the scope of the claims.

What is claimed is:

1. A method for efficient and automatic computation of tensor gradients of a user-defined computational model, whose inputs includes a tensor product, which is an output of a tensor contraction of at least two contracting tensors, with respect to said contracting tensors, in a computer-based environment, given the tensor product's gradient, which is the gradient of said computational model's output with respect to the tensor product, comprising:
   receiving the contracting tensors, a list of contracting dimensions, and the tensor product's gradient;
   verifying that the contracting tensors have equal dimension sizes along their contracting dimensions;
   applying a search algorithm to determine a transformation for each of the contracting tensors such that said transformations when applied on said contracting tensors do not alter an equivalent tensor contraction's product;
   computing transformed tensors by transforming said contracting tensors using said transformations;
   computing auxiliary tensor gradients by a tensor contraction, which is defined based on said equivalent tensor contraction's differentiation, between the transformed tensors and the tensor product's gradient; and
   computing tensor gradients of said computational model with respect to said contracting tensors by applying inverse functions on said auxiliary tensor gradients reversing the applied transformations;
   wherein tensor contraction defined on at least two contracting tensors refers to a tensor operation that performs tensor inner product, also known as tensor dot product, over no, one, or several contracting dimensions of the contracting tensors, while implicitly resulting an outer product along the rest of the dimensions, and consequently, if there are no contracting dimensions, it results in a tensor outer product of the contracting tensors; and wherein the tensors and tensor gradients are represented in a computer-based format; and wherein all tensors, tensor gradients and operations are subject to the numerical precision of the same machine on which said computational model is defined and on which said tensor gradients are automatically computed.

2. The method of claim 1, wherein the equivalent tensor contraction involves two transformed tensors both contracting over their first dimensions, or both contracting over their last dimensions, or contracting first dimensions of one transformed tensor with last dimensions of another transformed tensor, and the auxiliary tensor gradient of one of the contracting tensors is equal to a tensor contraction between the other transformed tensor and said tensor product's gradient over non-contracting dimensions of said other transformed tensor and corresponding dimensions of the tensor product's gradient.

3. The method of claim 1, wherein the tensor contraction involves sequential tensor contractions or the equivalent tensor contraction comprises a sequence of tensor contractions that contract some tensors over their last or first dimensions, or some tensors over their last dimensions while others over their first dimensions.

4. The method of claim 1, wherein the computed tensor gradients are further modified including being scaled, reshaped, or adjusted.

5. The method of claim 1, wherein the transformations permute tensors' dimensions, or apply linear or non-linear transformations.

6. The method of claim 1, wherein the computed tensor gradients are modified based on the transformations' differentiation.

7. A method for efficient and automatic computation of tensor gradients of a tensor model, in a computer-based environment, comprising:
decomposing the tensor model into its tensors and tensor operations; wherein tensors include variable types and constant types of tensors; and wherein a tensor operation includes elementary tensor operations, tensor contractions, or a combination of them, defined on at least one tensor; and wherein a tensor operation is defined as an elementary tensor operation where for a model defined on said tensor operation, the tensor gradients of said model with respect to the tensor operation's operands are each obtained by one elementary tensor operation defined, at minimum, on the tensor gradient of said model with respect to the tensor operation; and wherein the tensor gradients of a model defined on a tensor contraction with respect to the contracting tensors are computed by tensor contractions between the tensor gradient of the model with respect to the tensor contraction and contracting tensors; and, wherein for a model defined on any tensor operation, the gradients of said model with respect to the tensor operation's operands are computed by an elementary tensor operation, a tensor contraction, or a combination of elementary tensor operations and tensor contractions defined, at minimum, on the tensor gradient of said model with respect to said tensor operation;
constructing a computational model consists of interconnected elements representing tensors and tensor operations; wherein every element is designed to possess information and methods to read, compute, and return associated values to tensors or tensor operations they represent including tensor values, tensor operations, and tensor gradients; and wherein the computational model is arranged according to the tensor model, and wherein the computational model's connections are established such that the computational model's data flow begins with the elements representing tensors and progresses toward the computational model's outputs simulates the tensor model; and wherein, the connections can transform data flow including tensor values and tensor gradients both forward and backward;
assigning an initial tensor gradient to elements of the computational model;
initializing the computational model's elements which represent tensors;
propagating computational model's data flow begins with the elements representing tensors and progresses toward the computational model's outputs simulating the tensor model in a forward path; and
computing and propagating the computational elements' tensor gradients backward continues until all possible trajectories between each computational element of interest and computational model's outputs are traversed; wherein, an element's tensor gradient is the tensor gradient of an output of the model with respect to said element and said tensor gradient is trajectory-dependent; and wherein each computational element of interest accumulates its tensor gradients for all trajectories between said element and the model's outputs;
wherein the tensors and tensor gradients are represented in a computer-based format; and wherein all tensors, tensor gradients and operations are subject to the numerical precision of the same machine on which said computational model is defined and on which said tensor gradients are automatically computed.

8. The method of claim 7, wherein a computational element is designed to independently perform designated tasks, or be augmented by additional computational elements.

9. The method of claim 7, wherein an elementary tensor operation refers to an elementwise addition or subtraction of tensors, elementwise multiplication of tensors, and elementwise functions that apply identical or different operations on elements of a tensor, and whose ranges are smaller, greater, or equal in size and dimensionality in comparison to their domains.

10. The method of claim 7, wherein the tensor gradients are propagated forward along with the model's data flow, involves seeding tensor gradients for certain elements to compute the model's outputs and the rest of elements' tensor gradients.

11. The method of claim 7, wherein the tensor gradients are scaled while propagated.

12. The method of claim 7, wherein the method is employed in optimization methods and sensitivity analysis, or employed for applications including machine learning, neural networks, tensor networks, tensor decompositions, tensor completion, quantum computing and quantum circuit design, computer vision, data assimilation, physical and chemical systems simulation, earth systems modeling, financial modeling, drug discovery, and scientific computation, involving the iterative repetition of initializing tensor values and tensor gradients for at least one iteration within the constructed computational model.

13. The method of claim 7, wherein the method is implemented using a traditional computer, a quantum computer, quantum inspired computers, optical computers or photonic devices, field-programmable gate arrays (FPGAs), graphics processing units (GPUs), digital signal processors (DSPs), artificial intelligence (AI) accelerators, tensor processing units (TPUs), high performance computing (HPC), cloud computing, distributed computing, and servers.

14. A system for performing tensor automatic differentiation of a tensor model, in a computer-based environment, comprising at least one processor block, at least one memory block, input and output units, and a computer readable storage medium storing computer executable instructions, comprising:

decomposing the tensor model into its tensors and tensor operations; wherein tensors include variable types and constant types of tensors; and wherein a tensor operation includes elementary tensor operations, tensor contractions, or a combination of them, defined on at least one tensor; and wherein a tensor operation is defined as an elementary tensor operation where for a model defined on said tensor operation, the tensor gradients of said model with respect to the tensor operation's operands are each obtained by one elementary tensor operation defined, at minimum, on the tensor gradient of said model with respect to the tensor operation; and wherein the tensor gradients of a model defined on a tensor contraction with respect to the contracting tensors are computed by tensor contractions between the tensor gradient of the model with respect to the tensor contraction and contracting tensors; and, wherein for a model defined on any tensor operation, the gradients of said model with respect to the tensor operation's operands are computed by an elementary tensor operation, a tensor contraction, or a combination of elementary tensor operations and tensor contractions defined, at minimum, on the tensor gradient of said model with respect to said tensor operation;

constructing a computational model consists of interconnected elements representing tensors and tensor operations; wherein every element is designed to possess information and methods to read, compute, and return associated values to tensors or tensor operations they represent including tensor values, tensor operations, and tensor gradients; and wherein the computational model is arranged according to the tensor model, and wherein the computational model's connections are established such that the computational model's data flow begins with the elements representing tensors and progresses toward the computational model's outputs simulates the tensor model; and wherein, the connections can transform data flow including tensor values and tensor gradients both forward and backward;

assigning an initial tensor gradient to elements of the computational model;

initializing the computational model's elements which represent tensors;

propagating computational model's data flow begins with the elements representing tensors and progresses toward the computational model's outputs simulating the tensor model in a forward path; and computing and propagating the computational elements' tensor gradients backward continues until all possible trajectories between each computational element of interest and computational model's outputs are traversed; wherein, an element's tensor gradient is the tensor gradient of an output of the model with respect to said element and said tensor gradient is trajectory-dependent; and wherein each computational element of interest accumulates its tensor gradients for all trajectories between said element and the model's outputs;

wherein the tensors and tensor gradients are represented in a computer-based format; and wherein all tensors, tensor gradients and operations are subject to the numerical precision of the same machine on which said computational model is defined and on which said tensor gradients are automatically computed.

15. The system of claim 14, wherein the processor block comprises one or several central processing units (CPUs), one or several graphics processing unit (GPUs), field-programmable gate arrays (FPGAs), or a combination of them, either embedded or externally connected.

16. The system of claim 14, wherein a computational element is designed to independently perform designated tasks, or be augmented by additional computational elements.

17. The system of claim 14, wherein the input and output units are human-machine communication devices such as keyboard and display or machine-machine communication devices utilizing interfaces such as peripheral component interconnect express (PCIe), or other communication protocols.

18. The system of claim 14, wherein the tensor gradients are propagated forward along with the model's data flow, involves seeding tensor gradients for certain elements to compute the model's outputs and the rest of elements' tensor gradients.

19. The system of claim 14, wherein the tensor gradients are scaled while propagated.

20. The system of claim 14, wherein the system is employed in optimization methods and sensitivity analysis, or employed for applications including machine learning, neural networks, tensor networks, tensor decompositions, tensor completion, quantum computing and quantum circuit design, computer vision, data assimilation, physical and chemical systems simulation, earth systems modeling, financial modeling, drug discovery, and scientific computation, involving the iterative repetition of initializing tensor values and tensor gradients for at least one iteration within the constructed computational model.

* * * * *